United States Patent

Kornreich et al.

[11] 4,053,934
[45] Oct. 11, 1977

[54] MEASURING THE QUALITY OF IMAGES

[76] Inventors: Philipp G. Kornreich, North Syracuse; Stephen T. Kowel, Liverpool, both of N.Y.

[21] Appl. No.: 576,433

[22] Filed: May 12, 1975

Related U.S. Application Data

[60] Continuation-in-part of Ser. No. 434,102, Jan. 17, 1974, abandoned, Ser. No. 493,990, Aug. 1, 1974, and Ser. No. 499,606, Aug. 22, 1974, said Ser. No. 434,102, is a continuation-in-part of Ser. No. 319,680, Dec. 29, 1972, abandoned, said Ser. No. 493,990, is a continuation of Ser. No. 319,680, , said Ser. No. 499,606, is a continuation-in-part of Ser. No. 434,102, , Ser. No. 319,680, , and Ser. No. 365,054, May 30, 1973, Pat. No. 3,836,712, which is a division of Ser. No. 319,680.

[51] Int. Cl.² .......................... H04N 3/14; G02F 1/11
[52] U.S. Cl. ..................................... 358/213; 358/227; 350/161 S; 352/140; 354/25
[58] Field of Search .................. G03B/13/20; 178/7.1, 178/DIG. 29; 250/201, 234, 204, 567; 350/41, 46, 161; 352/140; 353/101; 354/25; 356/4, 71; 310/8.1, 8.3; 355/56; 358/213, 227; 340/146.3 P

[56] References Cited

U.S. PATENT DOCUMENTS

| | | | |
|---|---|---|---|
| 2,831,057 | 4/1958 | Orthuber | 250/204 |
| 3,450,018 | 6/1969 | John | 352/140 |
| 3,450,883 | 6/1969 | Thomas | 250/204 |
| 3,555,280 | 1/1971 | Richards | 250/34 |
| 3,689,772 | 9/1972 | George et al. | 250/211 J |
| 3,705,765 | 12/1972 | Renner | 352/140 |
| 3,781,110 | 12/1973 | Leitz et al. | 354/163 |
| 3,788,749 | 1/1974 | George | 356/71 |
| 3,836,712 | 9/1974 | Kornreich et al. | 178/7.1 |

OTHER PUBLICATIONS

Schneider et al., "Spatial Frequency Range Scanning Using a Zoom Objective", Applied Optics, Aug., 1972, vol. 11, No. 8, p. 1875.

*Primary Examiner*—John C. Martin

[57] ABSTRACT

Method and apparatus for measuring the quality and sharpness of images and for using the measurement results to control parameters such as camera and projector focusing, range finding, optical system modifications and the like. In one embodiment, an image is formed on a medium which has an electrical property that varies predictably with the sharpness of an image incident on it. The property is measured and the derived electrical signal controls automatic focusing of objective and projection lenses, range finder settings, and the like. The invention relies on the discovery of an interaction between images, strain waves and electrical properties in certain devices which allows deriving an electrical signal whose magnitude corresponds to high spatial frequency Fourier components of the image. In addition to other useful characteristics, the electrical signal is at a maximum when the overall sharpness of the image is high and drops off significantly as the image becomes blurred. Alternately, high frequency components of the spatial Fourier transform of images are found by other means, e.g., optically, and the magnitude of these components is used as an indication of the sharpness of the images, and of other parameters of optical systems.

60 Claims, 23 Drawing Figures

MEASURING THE QUALITY OF IMAGES

References to Related Applications

This application is a continuation-in-part, and hereby incorporates by reference the subject matter, of the following copending patent applications of the same inventors: (1) application Ser. No. 434,102, filed January 17, 1974, now abandoned which is in turn a continuation-in-part of application Ser. No. 319,680, filed on December 29, 1972 and now abandoned; (2) application Ser. No. 493,990, filed on August 1, 1974, which is in turn a continuation of said application Ser. No. 319,680; and (3) application Ser. No. 499,606, filed on August 22, 1974, which is in turn a continuation-in-part of (a) said application Ser. No. 434,102, (b) said application Ser. No. 319,680, and (c) application Ser. No. 365,054, filed May 30, 1973 and now Pat. No. 365,054, filed May 30, 1973 and now Pat. No. 3,836,712, which is in turn a divisional of said application Ser. No. 319,680. As to any subject matter of said copending applications, which is hereby incorporated by reference, this application claims the benefit of the first filing date of such subject in the chain of related applications.

BACKGROUND OF THE INVENTION

The invention relates to detecting and measuring the quality and sharpness of radiation images and to utilizing the resulting information. It finds particular utility in automatic focusing of cameras and projectors, in range finding, and the like.

In cameras and projectors, it is essential to properly focus an image in order to avoid loss of pictorial information. Focusing is usually manual, by adjusting the distance between the objective lens and the film in cameras, and by adjusting the distance between the projection lens and the image carrier in projectors. In some cameras focusing is eliminated by the use of the so-called universal focus lenses which do not require focusing adjustments within the distance range usually encountered by the amateur photographer. Such lenses, however, are a compromise between eliminating focusing problems and providing an image of optimum quality, and are therefore not satisfactory under all conditions. Attempts have been made therefore to provide various devices for automatically focusing conventional objective lenses, and similar attempts have been made for automatically focusing projection lenses. Some such devices rely on triangulation and measure the angle between the lines to a subject from two spaced-apart points on the camera (Pagel U.S. Pat. No. 3,442,193). Others rely on observing minute differences in the output of certain photocells between uniform and nonuniform distributions of light over their surface (Harvey U.S. Pat. No. 3,653,762). Still others rely on measuring the phase difference between different rays reflected from the subject to be photographed (Odone et al. U.S. Pat. No. 3,652,160). Still others rely on measuring the relative light intensity difference between two or more points of an image (Genahr U.S. Pat. No. 3,532,045 and Leitz U.S. Pat. No. 3,529,528). A survey of certain prior art focusing techniques can be found in Shin, I., Autofocus Camera, RADA Final Techn. Report TR-72-244, Oct. 1972, Defense Documentation Center No. AD-905-565L. In projectors, one automatic focusing device scans a line of the projected image and uses the count of certain transitions between light and dark as a measuring of focusing (Fenner U.S. Pat. No. 3,705,765).

While it is highly desirable to provide an indication of the sharpness of images, automatic focusing of cameras and projectors and automatic range finding, for various reasons having to do with complexity, reliability and effectiveness, no commercial devices of this type have enjoyed unqualified success. There is still a need for a way to detect and measure the sharpness and quality of images simply and reliably, and to utilize the result for accurate manual or fully automatic focusing and range finding, for modifications of optical systems, and the like.

SUMMARY OF THE INVENTION

The invention is in the field of measuring the quality and sharpness of images and in the field of utilizing the resulting measurements for manual or automatic focusing of cameras, projectors and other optical instruments, range finding, evaluation and modification of optical systems, image processing and the like. One aspect of the invention utilizes a discovery of an interaction between images and strain disturbances in certain media that allows deriving signals which represent the quality and sharpness of images. Alternate aspects of the invention utilize the recognition that high frequency spatial Fourier transform components of an image can be used in accordance with the invention to measure the quality and sharpness of an image, and to use the resulting measurement in a variety of fields.

Specifically, one aspect of the invention utilizes the discovery that certain media have a measurable electrical property which varies as a defined function of the intensity pattern of an image formed thereon and as a defined function of strain disturbances therein. When an image is formed on a medium of this type and strain disturbances are present in the medium, the property is measured to derive signals that very predictably with the quality and sharpness of the image. The signals may be utilized for purposes such as focusing cameras, projectors and other optical instruments, range finding, evaluation and modification of optical systems and of images and the like.

The strain disturbances in the medium may be elastic waves propagating through the medium, with the frequency of the waves selected to take into account the desirable resolution of an image and the size of the image. The image may be a light image, or an image defined by other suitable radiation. Any of a number of devices utilizing surface waves and properties or bulk waves and properties may be used.

One of the devices encompassed by the invention comprises a substrate of a material capable of undergoing time and space varying strain disturbances (e.g., fused quartz) and a film acoustically coupled to a surface of the substrate to undergo strain disturbances therewith. The film may be cadmium sulfide (CdS) and must have a property (e.g., electrical conductivity) that varies as a function of the intensity pattern of an image formed on it and as a function of time and space varying strain disturbances in it. A pair of electrically conductive contacts are disposed in electrical contact with the film and are spaced from each other by a strip of film. An image is projected on the film strip and a selected strain disturbance is propagated along the substrate surface that is acoustically coupled with the film. A potential difference is established between the contacts, and the electrical conductivity of the film strip is measured across the contacts to derive an electrical signal. The magnitude of the derived electrical signal is an accurate measure of the quality and sharpness of the image incident on the film strip. The film strip is usually narrow and the electrical signal represents essentially the quality and sharpness along a single dimension of a typical two-dimensional image. Two or more similar film strips that are parallel or at an angle can be acoustically coupled to the same substrate and electrically connected to enhance the significance of the electrical signal derived as discussed above. A two-dimensional measure of the quality and sharpness of an image may be obtained by propagating strain disturbances along intersecting directions.

The electrical signals derived from a device of the type described above are representative of spatial Fourier transform component of the image formed on the film strips. More precisely, the magnitude of each such signal corresponds to the magnitude of the coefficient of the Fourier series term representing the image at the spatial frequency of the surface wave at which the signal is derived. The sharper the image, the higher the magnitude of the high order Fourier series term or terms that represent that image and correspond to a suitable high surface wave frequency.

The spatial frequency of the strain wave can be chosen such that half wavelength is longer than the desired resolution of the image but is shorter than the image size. The magnitude of the corresponding Fourier series term then increases with increased quality and sharpness of the image and decreases with decreased sharpness of the image. Frequencies in the range of 3 – 8 MHz are suitable for most uses, but higher frequencies, for example to 40 MHz, are possible when higher resolution is desirable. The frequency of the strain wave may be swept through a defined range to make sure that the sharpness measurement depends only on the image quality and sharpness, and is independent of what the image is.

Any of a number of other devices utilizing the discovered interaction between images and strain waves may be utilized in place of the devices described immediately above. Some such devices have been described in the parent patent applications of which this application is a continuation-in-part. Another device, described in detail below, detects the image quality and sharpness at two planes and provides a real-time indication not only of the quality and sharpness of a selected image, but also of how an optical system should be modified to change the quality and sharpness of the selected image in a desired manner.

The electrical signals whose magnitude represent the quality and sharpness of an imgee may be utilized to control focusing, for range finding, for evaluation and modification of optical systems and images and the like. For example, a device embodying the invention may be incorporated in a camera to receive an image corresponding in quality and sharpness to the image which exposes the photographic film (or corresponding to a spot or a weighted average of that image). When the magnitude of the electrical signal derived from the device is at a maximum, so is the quality and sharpness of the image. The signal magnitude may be displayed, e.g., on a meter, or conventional servomechanisms may be used to control the focusing ring to maximize the magnitude of the signal from the device and to thereby optimize focusing. Similar devices may be incorporated in projectors, to look at the image projected on the screen. Then, the magnitude of the electrical signal derived from the device is at a maximum when the projected image is sharpest, and this may be utilized by a servomechanism to properly focus the projector lens. The same can be used with microscopes, to look at the magnified image, in range finding, and in other applications where information about the degree of focusing or about the degree of quality and sharpness of an image is important. Similarly, the invention is useful in detecting the quality and sharpness of images modulated by an optical system, by finding certain spatial Fourier transform components of the modulated images in accordance with the invented techniques, and then using the resulting measurements to evaluate and modify the optical system and images modulated by it.

Alternate aspects of the invention relate to the recognition that certain attributes of high frequency components of the spatial Fourier transform of an image correspond to the quality and sharpness of the image. Such high frequency components may be obtained optically, at the back focal plane of a lens through which the image is projected, or by other means, such as by Fast Fourier transform computers. The magnitudes of such high frequency components correspond to image quality and sharpness, and signals representing such magnitudes may be utilized as described above.

DETAILED DESCRIPTION

Certain embodiments of this invention utilize the discovery of an interaction between images, strain disturbances and electrical properties in certain media which is described in detail in the parent applications of which this application is a continuation-in-part and rely additionally on the discovery that under certain conditions the magnitude of the derived electrical signal varies predictably with the sharpness of the image. Additionally, the invention utilizes new types of interactions among images, strain disturbances and electrical properties, and utilizes certain optical interactions.

Figure 1:
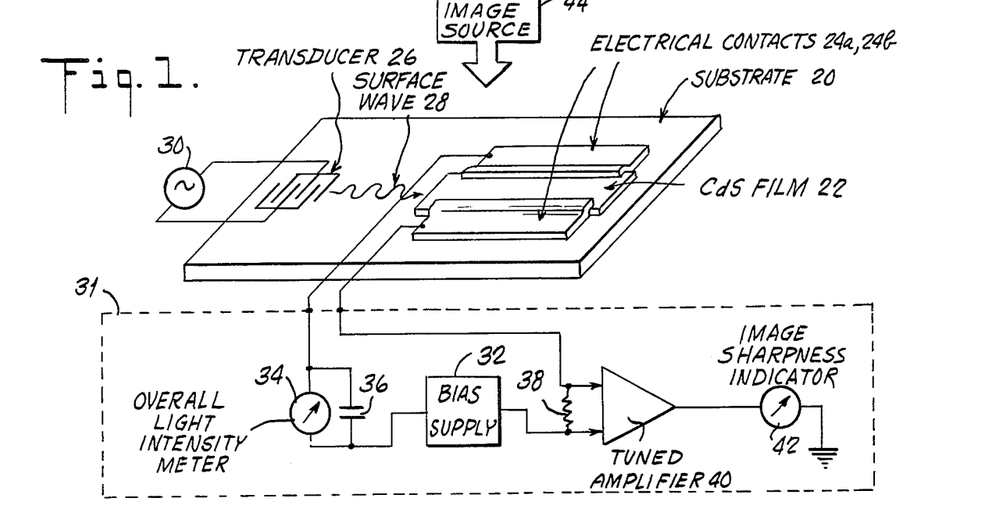
FIG. 1 is a partly perspective and a partly block diagram view of a device which obtains a measure of the sharpness and quality of an image incident on it.

Referring to FIG. 1, a device which illustrates the principles of the invention comprises a substrate 20 of a material capable of undergoing strain disturbances that vary in time and space, e.g., fused quartz, a film 22 of a material that has a measurable property varying as a function of an image incident on it and as a function of strain disturbances present in it, such as a polycrystalline cadmium sulfide film deposited over a portion of the substrate 20 and acoustically coupled with it to undergo said strain disturbances, and two electrical contacts 24a and 24b which partly overlap the film 22 and are in electrical contact with it, but are separated from each other by a narrow exposed strip of the film 22. A conventional interdigital transducer 26 is acoustically coupled with the same surface of the substrate 20 that carries the film 22 to generate a surface wave 28 propagating as indicated along that substrate surface. The transducer 26 is driven at a selected frequency by a suitable signal source 30.

The electrical signals of interest are derived through a network 31 that includes a bias supply 32 connected to the electrical contact 24a through a current meter 34 shunted by a capacitor 36 and connected to the electrical contact 24b through a resistor 38 to establish a constant potential between the contacts 24a and 24b across the exposed strip of the film 22. Note that this configuration is similar to the conventional cadmium sulfide light meters used in photographic cameras, and measures in a similar manner the overall light intensity of an image incident on the exposed strip of the cadmium sulfide film 22. Thus, the D.C. current through the meter 34 is a measure of the overall light intensity of an image incident on the exposed strip of film 22.

In order to derive the signal which, according to the invention, represents the sharpness of the image incident on the exposed strip of cadmium sulfide film 22, the network 31 further includes an amplifier 40 connected across the resistor 38 and a meter 42 measuring the output of the amplifier 40. The amplifier 40 is tuned to the frequency of the surface wave 28 to amplify only (or primarily) signals that are at the frequency of the signal source 30 driving the transducer 26. A suitable conventional connection may be established between the source 30 and the amplifier 40 for tuning the amplifier to the frequency of the source 30. The transducer 26 and the circuit which drives it can be shielded by a suitable electrostatic shield (not shown).

As discussed in detail in the parent patent applications, the magnitude of the signal at the output of the tuned amplifier corresponding to the magnitude of the Fourier series term representing the image incident on the exposed strip of film 22 for the frequency of the surface wave 28. For a properly selected frequency of the surface wave 28, the magnitude of the signal measured at the meter 42 represents the sharpness of the incident image. The image is from a source 44 which may be a focusing lens or any other suitable source.

The wavelength of the surface wave 28 should be chosen such that a half wavelength is longer than the desired optical resolution length but is shorter than the size of the image incident on the exposed strip of film 22 which is between the electrical contacts 24a and 24b. A surface wave with a half wavelength shorter than the desired resolution will "see" the edges between different intensity portions of the image as smooth, while a surface wave with a half wavelength longer than the size of the image will not see any sharp edges between different intensity areas of the image.

Figure 2:
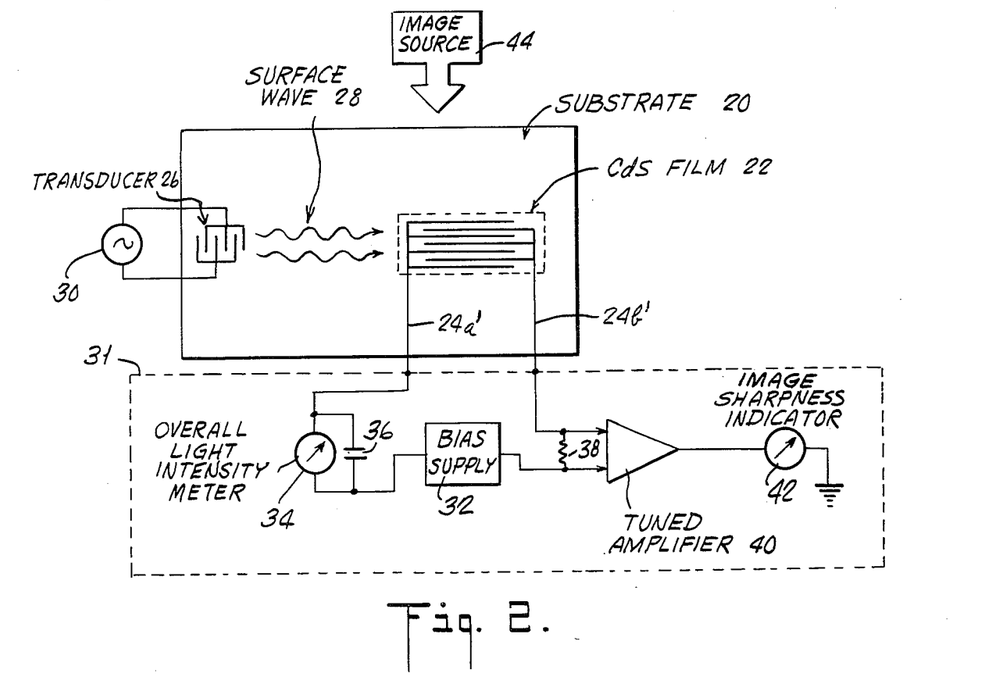
FIG. 2 is a partly plan and a partly block diagram view of an alternate device embodying the invention.

To increase signal-to-noise ratio, a device of the type illustrated in FIG. 2 may be used in place of the device discussed in connection with FIG. 1. The FIG. 2 device differs from the FIG. 1 device only in that it has interdigital electrical contacts 24a' and 24b' instead of the single pair of electrical contacts 24a and 24b separated by an exposed strip of film 22 as in FIG. 1. Each of the contacts 24a' and 24b' is in electrical contact with the film 22, but the two contacts and their interdigital fingers are electrically separate from each other. The meanings of the signals measured by the meters 34 and 42 in FIG. 2 are the same as in FIG. 1, i.e., the meter 34 measures the overall light intensity of the image incident on the strips of the film 22 that are between fingers of the contacts 24a' and 24b', and the meter 44 measures the sharpness of that image. The sharper the image incident on the film 22 in either FIG. 1 or FIG. 2, the higher the magnitude of the signal measured by the meter 42. It is noted that the interdigital configuration of the contacts 24a' and 24b' in FIG. 2 is very similar to the common, commercially available light intensity meters, and that the signal measured by the overall intensity meter 34 is of the same type and has the same meaning as the signal provided by such commercially available light intensity meters.

Figure 3:
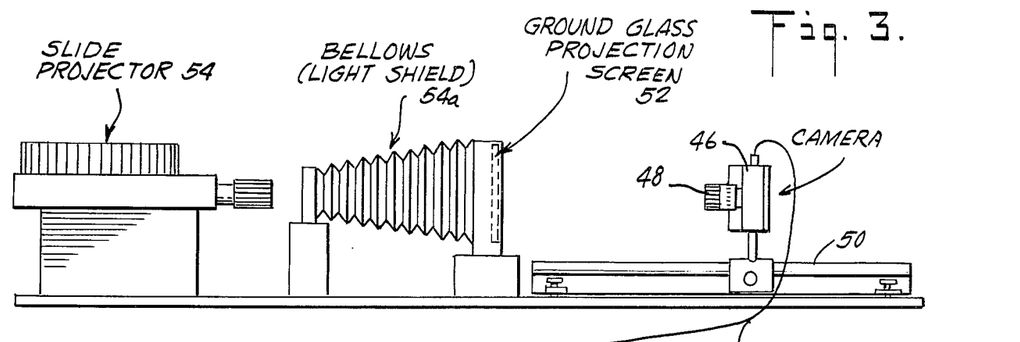
FIG. 3 is a side view of an experimental arrangement for measuring the sharpness of an image in accordance with the invention.
Figures 4, 5, 6:
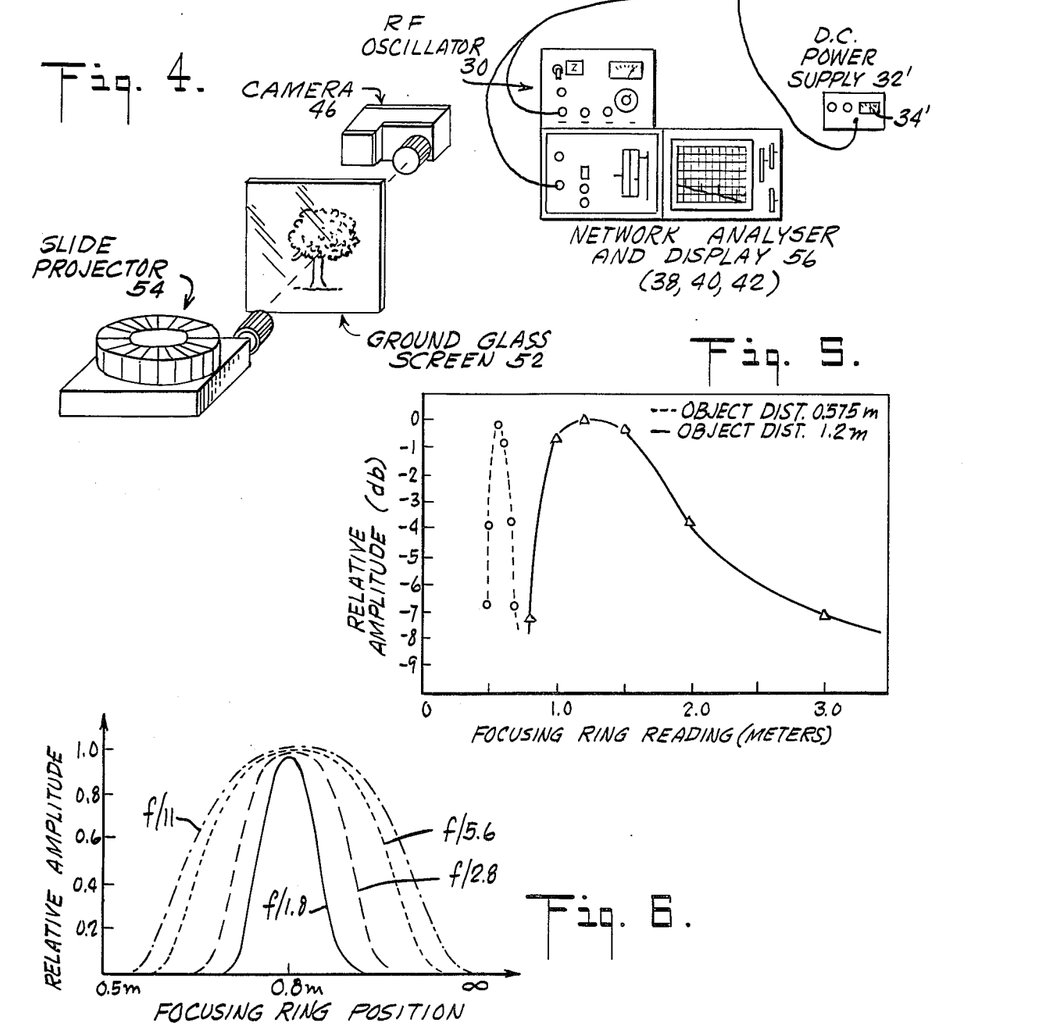
FIG. 4 is a partial perspective view of the arrangement shown in FIG. 3.
FIGS. 5 and 6 show graphs obtained with the experimental arrangement of FIGS. 3 and 4.

The operation of the invented device may be demonstrated by the arrangement of the type illustrated in FIGS. 3 and 4 where a device of the type shown in FIG. 2 is placed in a camera 46, with the cadmium sulfide film 22 of the device being in the normal film plane of the camera. The camera 46 has a conventional focusable lens 48, e.g., a commercial 55 mm., f/1.8 lens. The camera housing 46 is suitably supported on a slide bar 50 for movement toward and away from a ground glass screen 52 onto which a conventional projector 54, e.g., a Kodak slide projector, may project light images from slides. The ground glass screen 52 may have a bellows 52a for limiting extraneous light. The essential parts of the arrangement are shown in FIG. 4 where it is seen that the camera 46 looks at the image projected on the ground glass screen 52 by the slide projector 54.

The camera 46 encloses the substrate 20 of FIG. 2, which substrate carries the cadmium sulfide film 22, the contacts 24a' and 24b' and the transducer 26. The film 22 is at the camera film plane. A conventional RF oscillator 30' is used instead of the signal source 30 to drive the transducer 26, a conventional D.C. power supply is used instead of the bias supply 32, and the current meter of the D.C. power supply 32 serves the same function as the overall light intensity meter 34. A conventional network analyzer 56 serves the functions of: the resistor 38, the turned amplifier 40 and the image sharpness indicator 42 of FIG. 2.

When any suitable image is projected on the screen 52 by the projector 54, the current meter of the D.C. power supply 32' indicates the overall intensity of the image incident on the device housed in the camera 46, and the network analyzer 56 measures and indicates the signal which represents the sharpness of the image. To get readings, the transducer 26 inside the housing 46 is driven at a frequency selected as described above (e.g., between 3 and 8 MHz, corresponding to wavelengths of the order of 1 mm) and the network analyzer 56 is turned to detect a signal of about the same frequency.

Some experimental results are shown in FIGS. 5 and 6. FIG. 5 is obtained by rotating the focusing ring of the camera lens 48 while keeping all other settings constant, and gives the graph of focusing ring readings of the camera lens 48 versus magnitude of the signal measured by the network analyzer 56. The broken line curve is obtained when the best visual focusing of the camera lens 48 gives a focusing ring reading of 0.575 meters, and the solid line curve in FIG. 5 is obtained when the best visual setting of the focusing ring of the lens 48 gives a focusing ring reading of 1.2 meters. It is clearly seen that the maximum of the signal measured by the spectrum analyzer 56 occurs at the best visual focusing ring setting, where the observed image is sharpest, and that it falls off significantly on both sides of that setting. Similar curves are obtained when the lens 54a of the projector 54 is moved through its focusing range while all other settings are kept constant. FIG. 6 is a plot of normalized relative magnitudes of the signals measured by the network analyzer 56 versus focusing ring positions of the camera lens 48 for different $f$-stops. The best focusing obtained by eye is at the 0.8 meter focusing ring position and the shown curves are for the indicated $f$-stop settings of the lens 48. FIG. 6 illustrates how the measured signal curves change with $f$-stops of the lens. For higher $f$-stops, i.e., smaller aperture and greater depth of field, the curves are flatter because the optics define a greater range of "good" focusing; while for lower $f$-stops, i.e., for wider lens apertures and less depth of field, the curves are sharper and good focusing is at a well defined point. It is noted that the experimental results in FIGS. 5 and 6 are obtained by a crude experimental device which is not optimized for the purposes of this invention, but that they nevertheless clearly demonstrate the operability of the invention. It is also noted that in the embodiments of FIGS. 1-3, as well as in any similar embodiments of this invention, the magnitude of the electrical signal representing the overall intensity of the image may be subtracted from the magnitude of the electrical signal representing the image sharpness by a conventional electrical network (not shown), to thereby make the signal indicating sharpness even more independent of the overall image intensity.

Figure 7:
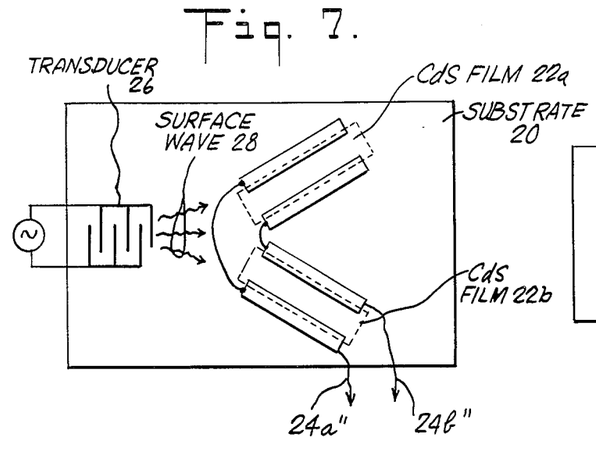
FIGS. 7, 8 and 9 are partial views of modifications of the device shown in FIG. 1.

FIG. 7 shows a modification of the devices illustrated in FIGS. 1 and 2 which provides for measuring the light intensity distribution along two intersecting lines of an image. When an image is projected on the substrate 20 in FIG. 7 and the leads 24a'' and 24b'' are connected to the network 31 shown in FIGS. 1 and 2, the magnitude of the signal measured by the image sharpness indicator 42 represents the light intensity distribution along two intersecting lines of the image (since the cadmium sulfide film strips 22a and 22b are at an angle to each other). Even if the image varies in light intensity only along one of the film strips 22a and 22b, the signal of interest is still meaningful and provides the desired measure of the image sharpness.

Figure 8:
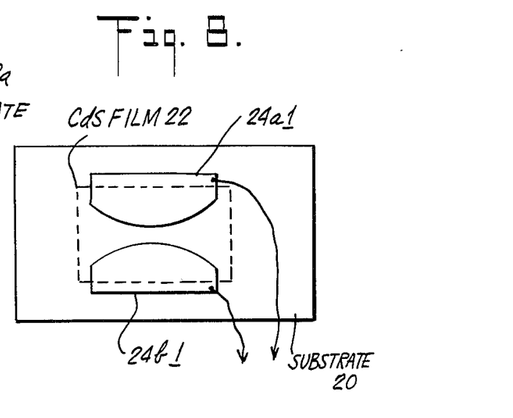
Figure 9:
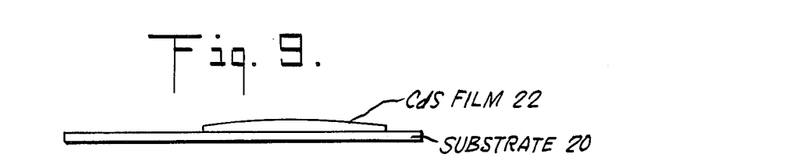

FIGS. 8 and 9 show modifications of the device shown in FIG. 1. In FIG. 1 the magnitude of the signal measured by the image sharpness indicator 42 is partly due to the image from the source 44 incident on the film 22 and partly due to the finite length and edge effects of the film 22. When there are reasonable variations in intensity of the projected image on the film 22 along the length of the film 22, the effect of the finite length and edge effects of the film 22 are not significant. However, when the intensity pattern distribution is not sufficient, for example, when a camera incorporating a device shown in FIG. 1 is looking at a blank wall, or the overall intensity of the image is extremely low, the edge effects may become significant. In order to minimize such edge effects, the contacts 2a and 24b may be shaped as shown in FIG. 8 such that the greatest contribution to the signal of interest is from the central region of the film 22. In FIG. 8 the contacts 24a1 and 24b1 having facing curved surfaces and are separated by the shortest distance at the central area of the film 22, while the distance between the contacts 24a1 and 24b1 increases in either direction along the length of the film 22. Thus, the resistance of the film 22 between the contacts 24a1 and 24b1 increases in either direction away from the central film area, and hence the contribution of the end areas of the film 22 toward the signal of interest decreases.

FIG. 9 illustrates a modification whose purpose is the same as that of the modification in FIG. 8. FIG. 9 shows a device which is identical to that of FIG. 1 (or FIG. 2) except that the cadmium sulfide film 22 is thickest at the central area of the exposed strip thereof and thins out in each direction away from the center along the length of the exposed strip 22.

Any of the devices discussed in the parent patent applications may be used for the purposes of this invention so long as the strain disturbance has a wavelength satisfying the conditions discussed above and the signal of interest is measured as discussed above. In addition, a novel device of the type illustrated in FIG. 10 may be used instead of the devices shown in FIGS. 1 and 2.

Figure 10:
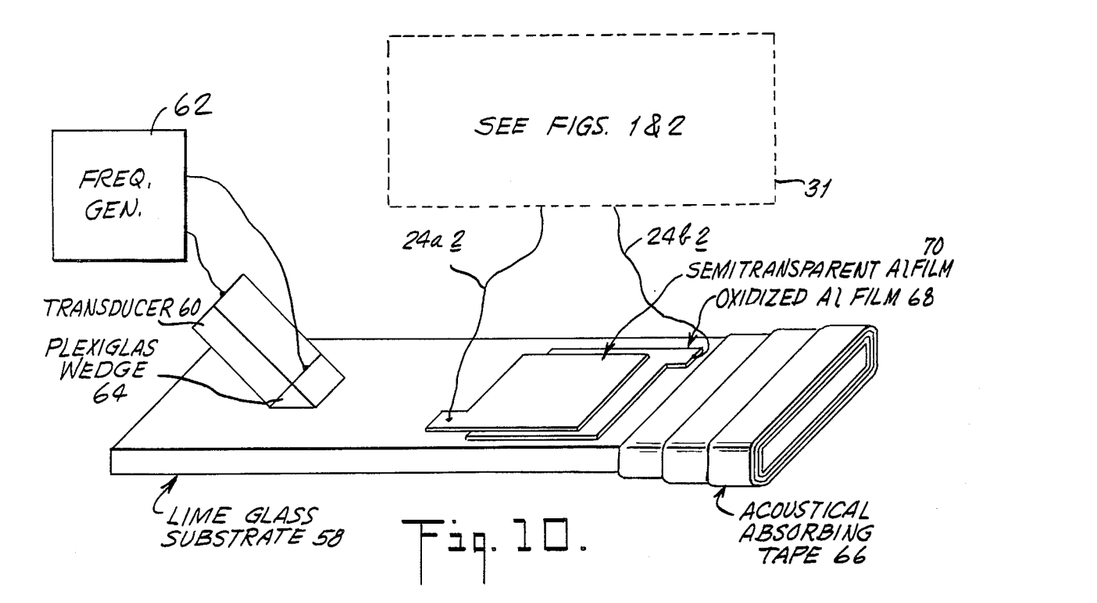
FIG. 10 is a partly perspective and partly block diagram view of an alternate device for measuring the sharpness and quality of an image.

The device in FIG. 10 comprises a substrate 58 similar to the substrate 20 discussed above. The substrate 58 may be, for example, lime glass. The substrate 58 is vibrated at a selected frequency by a transducer 60 driven by a frequency generator 62 and acoustically coupled with the substrate 58 through a Plexiglas wedge 64. The end of the substrate 58 opposite the transducer 50 is wrapped in acoustical absorbing tape 66 to make the surface waves induced in the substrate 58 traveling waves rather than standing waves. An aluminum film 68 is deposited over the top surface of the substrate 58, in acoustical coupling therewith, and the top surface of the film 68 is oxidized, to form an oxide layer which is very thin, of the order of hundreds of Angstroms. Another aluminum film 70 is disposed over the film 68 but is electrically isolated from it by the oxide layer on top of the film 68. The top aluminum film 70 is semitransparent so that an image incident on it can reach its interface with the aluminum oxide over the film 68. When the leads 24a2 and 24b2 are connected to the aluminum films 70 and 68 respectively, and an image is incident on the interface between the film 70 and the aluminum oxide on the film 68, the leads [24a2 and 24b] can be connected in the same manner to a measuring network 31 as the leads from the electrical contacts 24a and 24b in FIG. 1 to provide signals of the same significance. The difference is that the device in FIG. 10 is believed to use the change in the photon assisted tunnelling current between the films 68 and 70 to obtain an electrical signal representing a spatial Fourier transform of the image. The interaction of the image and the strain waves is believed to induce tunnelling across the oxide film which is a function of image intensity distribution.

Figure 11:
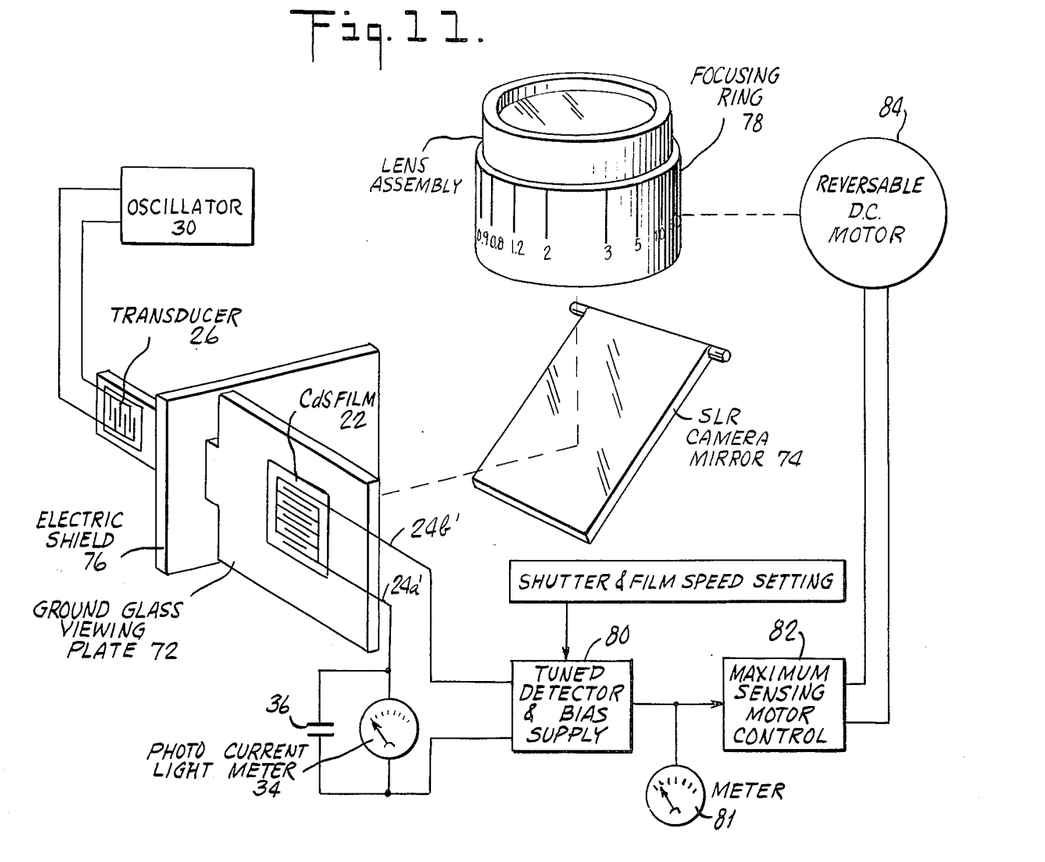
FIG. 11 is a partly perspective and partly schematic view of an arrangement for automatically focusing a camera lens which incorporates the device of FIG. 2.

The image sharpness indications provided in accordance with the invention may be utilized in any suitable situation where the sharpness of an image is important. One obvious field is in focusing cameras, such as still and movie photographic cameras and television cameras. one example of a system relying on the invention to focus automatically a single lens reflex still camera is illustrated in FIG. 11. Referring to FIG. 11, a conventional single lens reflex camera, which has a conventional ground glass viewing plate 72, is modified by the addition thereon of an image sharpness measuring device having a cadmium sulfide film 22 and electrical contacts 24a' and 24b' that are of the type illustrated in FIG. 2. The ground glass viewing plate 72 serves the function of the substrate 20, and is disposed to receive the same image which would be received at the film plane of the camera. This image is obtained from the single lens reflex mirror 74 in the conventional manner. The ground glass viewing plate 72 is vibrated at a selected frequency by a transducer 26 driven by a signal source 30 (an oscillator) in the same manner as discussed in connection with FIG. 2. The ground glass viewing plate 72 may be paddle-shaped, with the transducer 26 affixed to the handle part thereof, and an electric shield 76 may separate electrically the transducer from the contacts 24a' and 24b' to prevent electric coupling. Conventional spot focusing optics may be used to project on the film 26 only the portion of the field of view that should be in focus, or a weighted averaging system may be used, of the type presently used in better cameras for light-measuring purposes.

The contact 24a' is connected through a meter 34 in the same manner as in FIG. 2, with the meter 34 indicating the overall intensity of the image incident on the film 22. A tuned detector and bias supply 80 is used to apply suitable bias potential between the contacts 24a' and 24b' in the same manner as the bias supply 32 in FIG. 2, and to provide the signal that is provided in FIG. 2 at the output of the tuned amplifier 40. The output of the tuned detector and bias supply 80 is of the same nature as the output of the tuned amplifier 40 and is supplied to a maximum sensing motor control 32 that controls a reversible D.C. motor 84 driving a gear wheel 86 that engages the focusing ring 78 of the camera lens assembly. The bias supply 80 is adjustable to correspond to the shutter and film speed settings of the camera. For example, the bias supply 80 may include a variable resistor (not shown) that varies the potential between the contacts 24a' and 24b' in accordance with the shutter and film speed settings selected for the camera.

In operation, the reversible D.C. motor 84 may be coupled with the conventional film advance mechanism to always move the focusing ring 78 to the infinity setting after a picture is taken. Then, when another picture is about to be taken, the system illustrated in FIG. 11 is turned on and the camera operator looks at the subject to be photographed in the same manner used in conventional spot or weighted average focusing, with the image portion which must be in best focus incident on the cadmium sulfide film 22. The motor control 82 turns on the D.C. motor to rotate the focusing ring down from its infinity setting until the output of the tuned detector 80 is at its maximum.

If desired, the signal from the detector 80 may be observed on a meter 81 which would be at a maximum at best focus. Further, the connection between the detector 80 and the motor control 82 may be interrupted, or the motor control 82 and the motor 84 may be omitted, so that focusing may be manually set in accordance with the showing of the meter 81.

Figure 12:
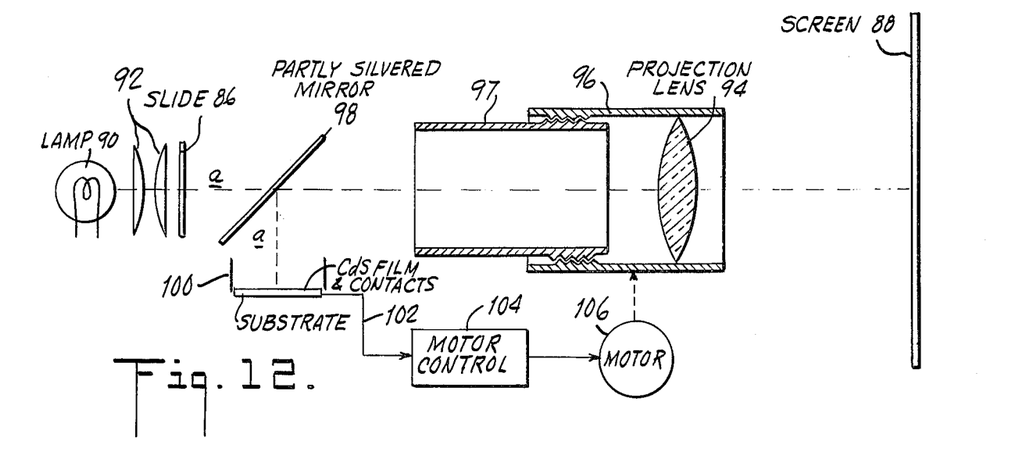
FIG. 12 is a partly sectional and partly schematic view of an arrangement for automatically focusing a projector lens which incorporates the device shown in FIG. 2.

An arrangement similar to that in FIG. 11 may be used to focus the projection lens of projectors such as slide or movie projectors. Referring to FIG. 12, which illustrates the pertinent portions of a conventional slide projector, the image of a slide 86 is projected onto a screen 88 by a light beam from a lamp 90 which is collimated by a condensor lens 92 and is focused by a projection lens 94 supported in a sleeve 96 mounted for relative movement with respect to the slide 92 on another sleeve 97 fixedly supported by the projector housing (not shown).

In accordance with the invention, a partly silvered mirror 98 is interposed between the slide 86 and the projector lens 94, at a 45° angle with respect to the optical axis, to pass most of the light impinging on it from either direction but to reflect part of the light from the screen 80 onto the back plane of a housing 100, where a device similar to that shown in FIG. 2 is located. The distance $a$ between the slide 88 and the mirror 98 is the same as the distance a between the mirror 98 and the CdS film of the device in the housing 100. The cadmium sulfide film 22 of the device in the housing 100 "looks" at the mirror 98, and thus at the screen 88, or at a portion thereof. The electrical leads 102 from the device in the housing 100 are connected to a control circuit 104 which is the same as the corresponding circuit in FIG. 11 between the leads 24a and 24b and the reversible motor 84. The control circuit 104 controls a motor 106, similar to the motor 84 in FIG. 11, which positions the projection lens 94 with respect to the slide 92 by suitably rotating the sleeve 96.

In operation, the projection lens 94 may start from an extreme position, so that the motor 106 can be rotated from that extreme position until the electrical signal from the device in the housing 100 is at a maximum, and can then stop the projection lens 94. As an alternative, the control circuit 104 may include a conventional differentiating network (not shown) so that the projection lens 94 can start from any position and the motor 106 can move it in the proper direction toward focusing the image on the screen 88. More specifically, the output of the device in the housing 100 in FIG. 12 is similar in shape to the curve shown in FIG. 6; differentiating the signal producing these curves gives a null at the curve peak and either a positive or a negative signal on the sides of the peak. The control circuit 104, containing a differentiating network of this type, would produce a null output to keep the motor 106 stationary at the proper focusing position of the lens 94, and either a positive or a negative signal for driving the motor 106 in the proper direction when the lens 94 is too close to or too far from the slide 86.

Figure 13:
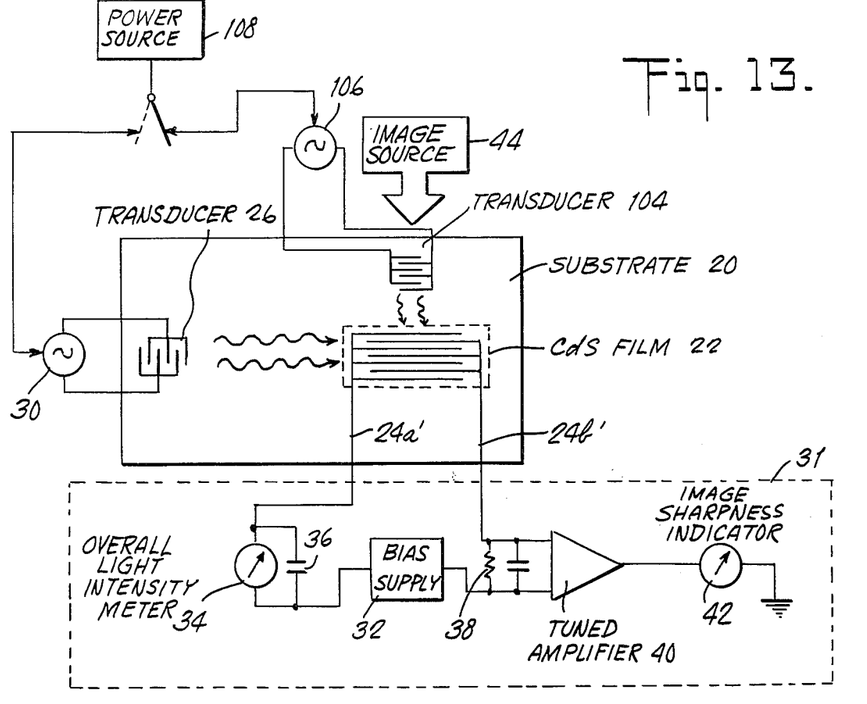
FIG. 13 illustrates an alternate device embodying the invention.

Two-dimensional focusing can be carried out with a device of the type shown in FIG. 13. The device in FIG. 13 is similar to that in FIG. 2, except that it has a second transducer 104 driven by a second frequency generator 106. The transducer 104 induces in the substrate 20 another surface wave which propagates through the area of the cadmium sulfide film 22 in a direction perpendicular to that of the surface wave induced by the transducer 26. A power source 108 alternately energizes the oscillators 30 and 106 so that only one operates at a time. As an alternative, the oscillators 30 and 106 may operate simultaneously.

Figures 14, 15:
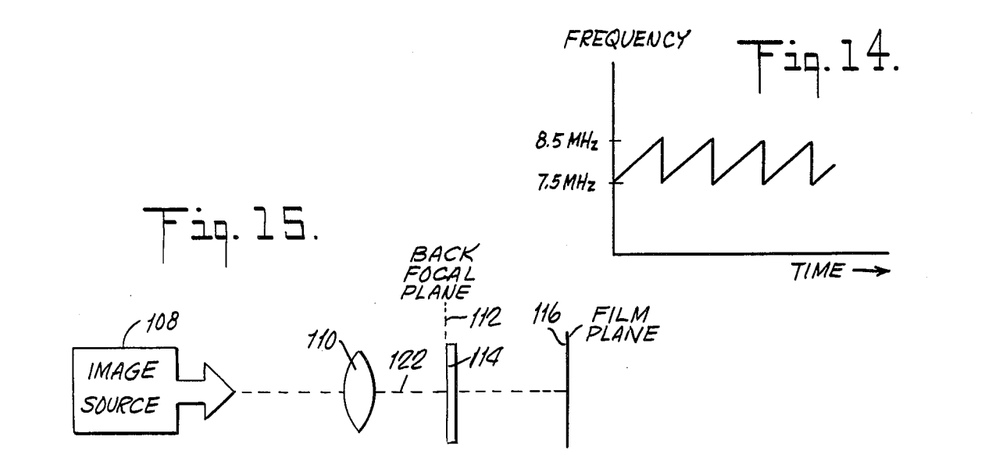
FIG. 14 illustrates a frequency vs. time graph for an alternate manner of generating strain waves.
FIGS. 15 and 16 illustrate an alternate device for obtaining a measure of the sharpness of an image by using high frequency optical Fourier transform components.

It may be desirable in some uses of the invented devices to sweep the surface wave in the substrate 20 through a range of frequencies. To this end, the oscillators 30 and 106 may sweep through a selected range of frequencies, as shown in FIG. 14. For example, the oscillator 30 in FIG. 2 may be a voltage controlled oscillator driven with a sawtooth voltage from a similar power source (not shown) such that its frequency varies as shown in FIG. 14. In the embodiment of FIG. 13, the power source 108 may drive the oscillators 30 and 106 to sweep through alternating ramps of the sawtooth shown in FIG. 14. The meter 42 usually has enough inertia to time average the output of the amplifier 40 over a suitable time constant; if it does not, a small capacitor 110 may be connected in parallel with the resistor 38.

For range finding, a lens assembly with a shallow depth of field may be in an arrangement similar to that shown in FIG. 11, and may be calibrated to focusing ring marks at object distances for which the object is at best focus, as indicated by the meter 81. Then, the lens assembly may be used to find the unknown distance to an object by bringing the object into best focus, at a lens aperture corresponding to a shallow depth of field, and reading the corresponding focusing ring mark.

Fourier transforms of images may be obtained by devices other than those described above and may be similarly utilized according to principles of the invention. For example, spatial Fourier transforms of images may be obtained by computer processing of digitized images or by optical processing of images.

Figure 16:
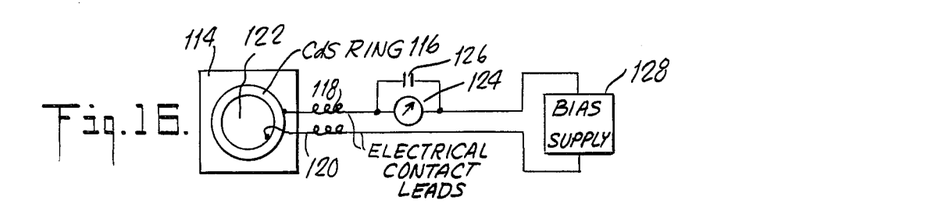

Referring to FIGS. 15 and 16, the spatial Fourier transform of an image from a source 108 appears at the back focal plane 112 of a lens 110, as discussed for example in Poppelbaum, Computer Hardware Theory, McMillan 1972, page 626 et seq. The surface of a plate 114 which is at the back focal plane of the lens 110 thus receives a pattern which is the spatial Fourier transform of the image from the source 108. As known in the prior art, the higher frequency Fourier transform components are represented further from the optical axis 122. In accordance with the invention, a specific radial distance from the optical axis 122 may be chosen to select Fourier transform components which correspond to a desired sharpness resolution, and the magnitude of these components may be measured by measuring the intensity of only these selected Fourier transform components.

Referring to FIG. 16 a ring 116 of a photosensitive material such as CdS is disposed on the surface of the plate 114 which is in the back focal plane 112, and two concentric electrical contacts 118 and 122 are disposed in electrical contact with the material of the ring 116. The leads from the electrical contacts 118 and 120 are connected across a series network of a voltmeter 124 shunted by a capacitor 126 and a constant current bias supply 128. The meter 124 thus measures the conductivity of the ring 116, which is a function of the intensity (magnitude) of higher frequency spatial Fourier transform components of the image from the source 108. The radius of the ring 116 is chosen to provide a measure of sharpness of the image from the source 108 to a desired resolution. Greater radius means greater resolution, and conversely.

In actual use, the lens 110 may be taking lens of a camera having a film plane 116, and the plate 114 together with the ring 116 and the electrical contacts 118 and 120 may be sufficiently transparent so as not to affect adversely the image projected on the film plane 116. Alternately, the plate 114 may be positioned away from the optical axis 122, and a partly silvered mirror may be used to effectively place it at the back focal plane of the lens 110. The photosensitive material, which in FIG. 16 is in a form of a ring, may be in other suitable shapes, such as a rectangle or an arc, so long as it measures only the intensity of selected high frequency Fourier transform components and not the intensity of lower frequency components. Since the electrical signal derived from the device illustrated in FIGS. 15 and 16 is a measure of the sharpness of the image, the device of FIGS. 15 and 16 may be utilized in the same manner as the devices discussed earlier.

In detecting the sharpness of an image provided by an optical system it is often desirable to immediately know how the optical system should be modified to bring the image to a desired degree of sharpness. For example, when trying to focus a photographic camera, it is desirable not only to know whether the camera is in focus or not but to also know which way the focussing ring should be turned to focus the camera. One way of doing so, in accordance with the invention, is with arrangements of the type illustrated in FIGS. 17, 18 and 19.

Figure 17:
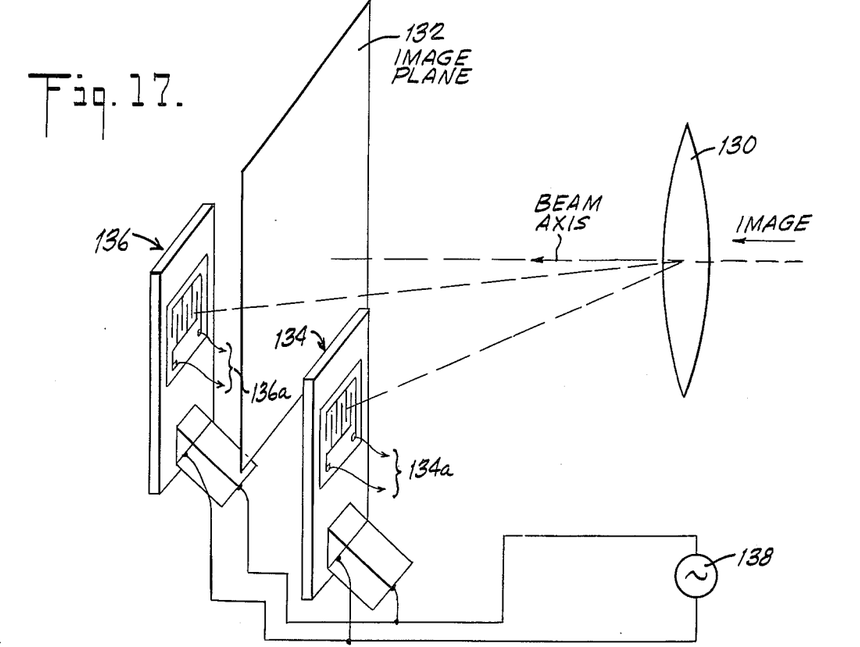
FIG. 17 is a partly perspective and partly schematic showing of an arrangement for detecting the sharpness of an image.

Referring to FIG. 17, an optical system schematically illustrated at 130 forms an image beam extending along the indicated direction, and there is an image plane 132 which is transverse to the beam axis. In the case of a photographic camera, the image plane 132 can be the film plane (or another plane which is optically equivalent to the film plane). A first device 134 is positioned just ahead of the image plane 132 along the beam axis and a second device 136 is positioned just behind the image plane 132 along the beam axis. The devices 134 and 136 are parallel to each other and to the image plane 132, and each receives a portion of the image formed by the optical system 130. Each of the devices 134 and 136 may be identical to the device shown in FIG. 2, and each provides an output signal indicating the sharpness of the pattern of light formed on it. When the devices 134 and 136 are driven by an oscillator 138, as discussed in connection with FIG. 2, the signals provided that their respective output leads 134a and 136a are applied respectively to the sharpness signal detectors 140 and 142 shown in FIG. 19. Each of the detectors 140 and 142 may be identical to the detector 31 in FIG. 2, and each provides at its output a signal corresponding to the output of the amplifier 40 in FIG. 2. The output of the detector 40, labeled A, and the output of the detector 142, labeled B, are applied to a comparator 144, which provides one of three possible output signals; an output signal indicating that the signal A is greater than the signal B, an output indicating that the signals A and B are equal, or an output indicating that the signal A is smaller than the signal B. The outputs of the comparator 144 are applied to an indicating and utilizing device 146. The device 146 may be simply a meter, or may simply comprise three indicating lights connected to indicate which of the three outputs of the comparator 144 is energized. Alternately, the device 146 may be a system corresponding to the motor 84 in FIG. 11, driving the focussing ring 78 in one direction when the top output (A>B) of the comparator 44 is energized, driving the focussing rings 78 in the opposite direction when the bottom output (A<B) of the comparator 144 is energized and leaving the position of the focussing ring 78 unchanged when the middle output (A=B) of the comparator 144 is energized, to thereby automatically focus the lens assembly having the focussing ring 78. Still alternately, the device 146 in FIG. 19 may comprise the motor control 104 and the motor 106 in FIG. 12, for driving the projection lens 94 in the direction toward best focus.

Note that the type of imbalance between the signals A and B indicates the direction along the beam axis from the image plane 132 in FIG. 17 toward the plane of best focus. For example, if the signal A from the device 134 is greater than the signal B from the device 136, the plane best focus is ahead of the image plane 132 (i.e. toward the optical system 130); conversely, if the signal B is greater than the signal A, then the plane of best focus is behind the image plane 132 (i.e. away from the optical system 130). Thus, the system illustrated in FIGS. 17 and 19 provides an immediate, real time indication not only of whether the image plane 132 is in best focus, but also of the direction in which one must move to reach the plane of best focus from the image plane.

Figure 18:
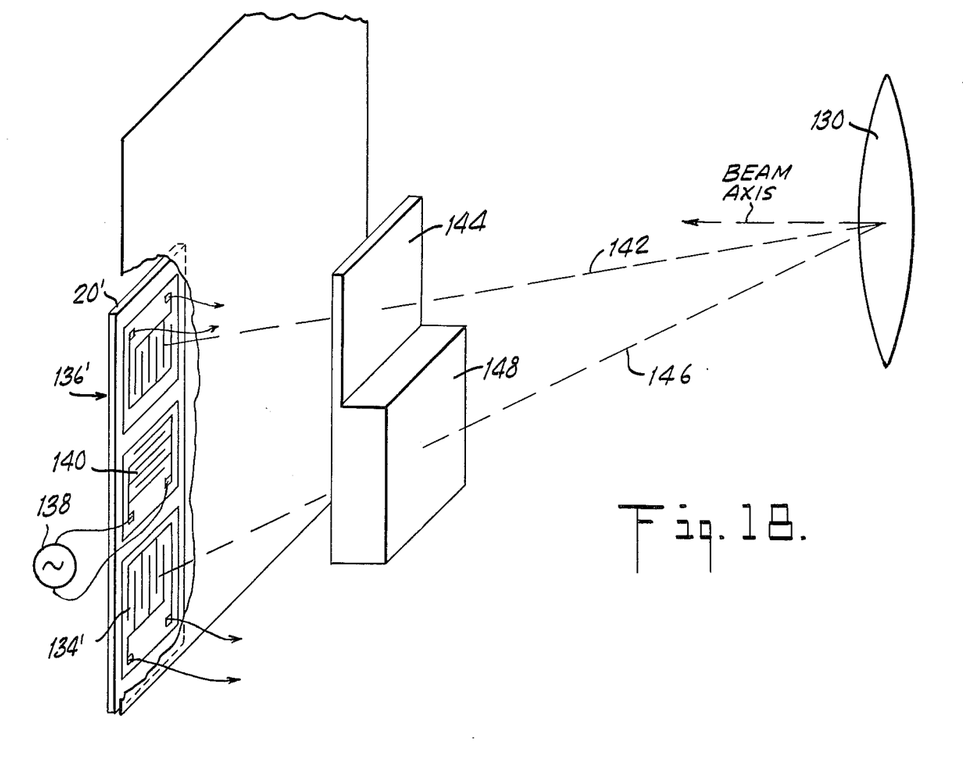
FIG. 18 is an alternate arrangement for detecting the sharpness of an image.

Referring to FIG. 18, an alternate way of detecting the sharpness at two planes which flank the image plane 132 is to have two sharpness detecting devices 134' and 136' physically in the same position with respect to the image plane 132, but to optically form on them patterns which correspond to the image sharpness at two planes flanking the image plane 132. For this purpose, the pattern formed on the device 136' results from passing the image beam formed by the optical system 130 through a thinner portion 144 of a retarding glass prism, while the pattern formed on the device 134' results from passing the image beam formed by the optical system 130 through a thicker portion 138 of the retarding glass prism. The arrangement shown in FIG. 18 is substantially equivalent in function to the arrangement discussed above in connection with FIGS. 17 and 19, the main difference being that the two patterns are formed on the same plane but correspond to different image planes of the image along the beam axis formed by the optical system 130. The devices 134' and 136' may be similar to the device shown in FIG. 2; however, rather than having a single film and a single set of contracts, the arrangement of FIG. 18 uses a single substrate 20' comprising a device 134' and 136' spaced from each other along the length of the substrate 20' and an interdigital transducer 140 disposed on the substrate 20' intermediate the devices 134' and 136' and driven by an oscillator 138. Again, any of the previously discussed devices for measuring the sharpness of an image may be used instead of the devices 134' and 136', and the outputs of the devices 134; and 136' may be utilized as discussed in connection with FIG. 19.

Figure 19:
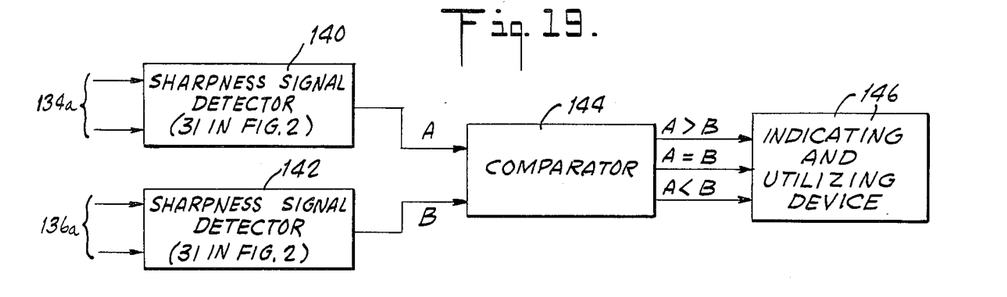
FIG. 19 is a block diagram of a system for utilizing the signals derived from the arrangements shown in FIGS. 17 and 18.

The system shown in FIGS. 17 and 19 is for the case where the patterns formed on the devices 134 and 136 correspond to the images at planes equidistant from the image plane 132. In this case, the image at 132 is at best focus when the images for the devices 134 and 136 are equally blurred. However, it should be clear that the devices may detect the sharpness of patterns for image planes which are at different distances along the beam axis from the image plane 132; the image at 132 would then be in best focus at a selected degree of imbalance between the outputs of the devices 134 and 136 which corresponds to the ratio of the effective distances of the devices from the image plane 132.

Figure 20:
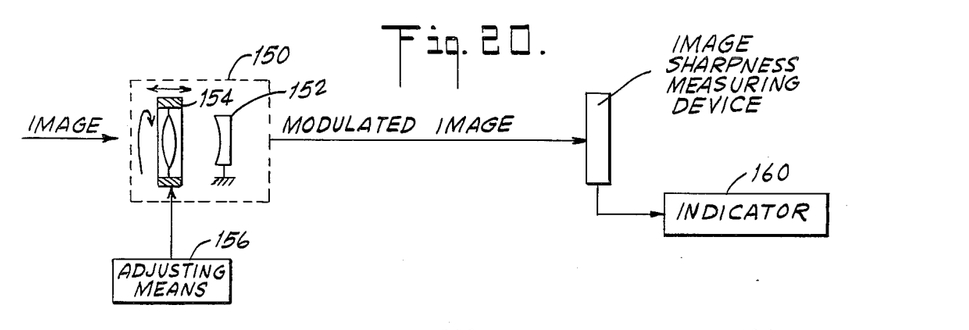
FIG. 20 is a schematic showing of a system for using the invention in modifying an optical system.
Figure 21:
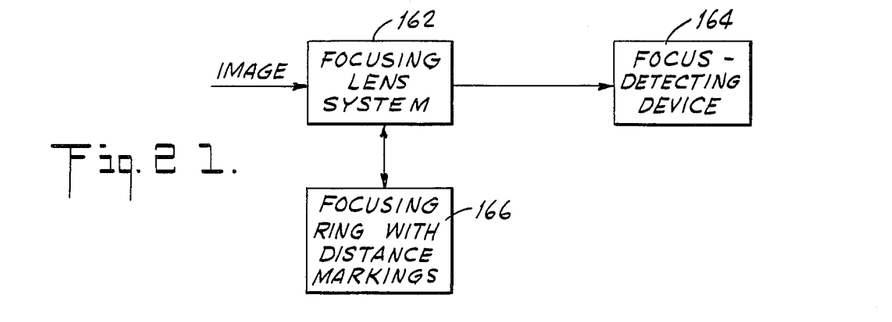
FIG. 21 is a block diagram of a range-finding system incorporating the invention.
Figure 22:
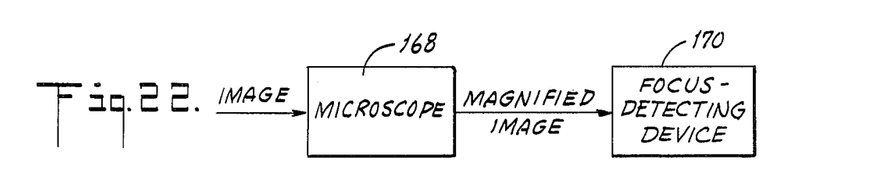
FIG. 22 is a block diagram of a microscope incorporating the invention.
Figure 23:
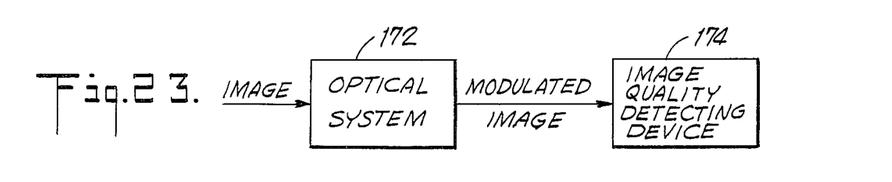
FIG. 23 is a block diagram of detecting the quality of an image modulated by an optical system by using the invention.

The invention finds specific uses in a number of additional devices, as illustrated schematically in FIGS. 20-23. Referring to FIG. 20, an optical system 150 comprises a first element (e.g. lens) 152 and a second element (e.g. lens) 154 which is movable in three dimensions with respect to the element 152 by an adjusting means 156. An image such as a test pattern passes through the optical system 150 and emerges therefrom as a modulated image which forms a light pattern on an image sharpness measuring device 158 provided with an indicator 160. The device 158 may be any of the sharpness measuring devices discussed previously (e.g. the device shown in FIG. 2) and the indicator 160 may be equivalent to the element 31 in FIG. 2, with the possible addition of a circuit (not shown) for normalizing the output of the amplifier 40 to make it completely unaffected by the overall intensity of the light pattern formed on the device 158. The position of the element 154 with respect to the element 152 may be adjusted manually or otherwise by adjusting means 156 until the sharpness of the modulated image detected by the device 158 is at an optimum value (e.g. at a maximum) as indicated by the indicator 160. Examples of this use of the invention are situations such as adjusting multielement optical systems in assembly and manufacture, aligning optical systems, and the like. Referring to FIG. 21, focussing lens system 162 receives an image of a scene and focuses the received image on a focus detecting device 164 which may be any of the sharpness detecting devices discussed above. The focussing lens system is of the type used in range-finding devices relying on focussing or in photographic cameras which can be focussed, and has a focussing ring 166 with distance markings indicating the distance to the scene which is being focused. In operation of the arrangement in FIG. 21, the focussing lens system 162 is adjusted with the focussing ring 162 until the focus detector device 164 indicates best focus. The distance marking corresponding to the selected focussing ring position indicates the distance between the scene focused on the device 164 and the focussing lens. Referring to FIG. 22, an optical microscope 168 receives an image of an object and provides a magnified image, and at least a portion of the magnified image is viewed by a focus detecting device 170, which may be any of the devices discussed previously which provide an output signal indicating the sharpness of an image formed thereon. The normal microscope controls for focussing are operated until the signal provided by the focus detecting device 170 indicates best focus. Referring to FIG. 23, an optical system 172 receives an optiical image, optically processes the received image and provides a resulting modulated image which is viewed by an image-quality detecting device 174. The device 174 may be any of the devices discussed previously and the image quality may be the sharpness of the image measured as discussed above, or it may be some other quality of the image. For example, the image quality detected by the device 44 may be an image quality which is an indication of a transfer function of the optical system 172 and may be used to modify or identify the optical system 172 and the image modulated by it. For example, the relation of the modulated image to the received image can be described in the space domain by a two dimensional convolution integral in which the optical impulse response of the optical system is convolved with the modulated image to yield the received image. In the transform domain, the Fourier transform of the modulated image is the product of the optical transfer function, or the coherent transfer function of the optical system with the transform of the received image. With the system illustrated in FIG. 23, the transfer function of the optical system 172 (or at least components of it) can be measured in real time by measuring selected Fourier transform components of a selected image modulated by it, and the resulting measurements can be used to determine the relationship between the received image and the modulated image and for modifying the optical system 172.

The devices 134 and 136 may be any of the other devices discussed previously which provide an indication of image sharpness. The oscillator 138 may operate either at a single frequency or through the range of frequencies discussed in connection with FIG. 14. The detectors 140 and 142 may be any circuits for providing the desired signals. For example, instead of the circuit shown at 31 in FIGS. 2 and 13, the detectors 140 and 142 may additionally include a circuit (not shown) for combining the DC and the AC components of the detected signals to make the signals A and B are completely independent of the overall intensity of the patterns formed on the devices. Similarly, the patterns formed on the devices 134 and 136 may be derived by directly looking at a portion of the beam formed by the optical system 130, as expressly shown in FIG. 17, or may be formed by optically deriving suitable representations of the beam image at the desired planes, e.g. by half silvered mirrors, etc. The requirement which must be satisfied for the operation of the system shown in FIG. 17 is that the pattern formed on the device 134 must correspond to the image sharpness at a plane ahead of the image plane 132 and the pattern formed on the device 136 must correspond in sharpness to the pattern formed at a plane behind the image plane 132. If the patterns correspond to less than the entire image, then it is preferable that the patterns correspond to the same portion of the image.

We claim:

1. Apparatus for detecting the sharpness of an image comprising:
   a medium having a measurable property which varies as a function of the intensity pattern of an image formed thereon and as a function of strain disturbances in the medium;
   means for forming a selected image on the medium;
   means for causing a selected strain disturbance in the medium which propagates along the image formed on the medium; and
   means for measuring said property while the image is formed on the medium and while the selected strain disturbance is present therein and for deriving thereby a signal which is a Fourier transform representation of an aspect of the entire image and which represents the sharpness of the image formed on the medium but is substantially independent of the average intensity of the image formed on the medium and means for utilizing said signal for control purposes.

2. Apparatus as in claim 1 wherein said selected strain disturbance is periodic in time and space.

3. Apparatus as in claim 2 wherein said selected strain disturbance is a strain wave of a selected spatial frequency.

4. Apparatus as in claim 3 wherein said selected spatial frequency corresponds to a spatial wavelength which is longer than twice the maximum desired measurable resolution of the selected image but is substantially shorter than the size of the selected image.

5. Apparatus as in claim 3 wherein the selected spatial frequency corresponds to spatial wavelength of the order of one millimeter.

6. Apparatus as in claim 1 wherein said property varies as a function of the image sharpness along only a single selected dimension of the image.

7. Apparatus as in claim 1 wherein said property of the medium varies as a function of the image sharpness along at least two dimensions of the image.

8. Apparatus as in claim 1 wherein: said selected strain disturbance in the medium is a selected strain wave propagating through the medium; the signal derived by measuring said property is an electrical signal and the steady state magnitude thereof represents said sharpness; and said magnitude corresponds to a Fourier transform representation of the intensity pattern along at least one dimension of the image formed on the medium for the spatial frequency of the selected strain wave.

9. Apparatus as in claim 1 wherein: said medium comprises a substrate of a material capable of undergoing strain disturbances and a film acoustically coupled to a surface of the substrate to undergo strain disturbances therewith and having an electrical property which varies as a function of the intensity pattern of an image formed thereon and as a function of strain disturbances in the film, and a pair of electrically conductive contacts disposed in electrical contact with the film and spaced from each other by a strip of film; said means for forming an image on the medium forms said image on the strip of film; and said measuring means includes an electrical bias source connected to the two contacts to establish a potential difference therebetween across the film strip and means for detecting the electrical conductivity of the film strip to derive an electrical signal representing the sharpness of the entire image formed on the film strip along the length of the strip.

10. Apparatus as in claim 9 wherein the means for causing a strain disturbance propagates a surface strain wave along the surface of the substrate facing the film.

11. Apparatus as in claim 1 wherein: the medium comprises a substrate of a material capable of undergoing strain disturbances and a film acoustically coupled to a surface of the substrate to undergo strain disturbances therewith and having an electrical property which varies as a function of the intensity pattern of an image formed on the film and as a function of strain disturbances in the film; the means for forming an image on the medium forms the image on at least a portion of the film; and the measuring means measures said electrical property of the film to derive an electrical signal corresponding to a selected spatial wavelength of the strain disturbance and representing the resolution of the image formed on the film, and comprises an interdigitated plurality of first and second electrically conductive contacts disposed in electrical contact with the film, with the first contacts electrically connected to each other and the second contacts electrically connected to each other, but with the first and second contacts spaced from each other long the film, and means for establishing a selected bias between the first and second contacts, said electrical signal corresponding to the conductivity of the film between the first and second contacts for said selected spatial wavelength.

12. Apparatus as in claim 11 wherein the measuring means measures the AC conductivity of the film between the contacts for the wavelength of the selected thereby disturbance.

13. Apparatus as in claim 12 wherein the magnitude maximum of the measured electrical signal corresponds to maximum sharpness of the image when the image sharpness varies through a selected range.

14. Apparatus as in claim 1 wherein the medium comprises: a substrate of a material capable of undergoing strain disturbances, a first electrically conductive film disposed on a surface of the substrate, a selected electrically isolating film disposed on the first conductive film and in acoustic coupling with the substrate, and a second electrically conductive film disposed on the side of the isolating film facing away from the substrate, at least one of said conductive films being substantially transparent to said image; the image forming means forms the image on the isolating film; and the measuring means comprises means for measuring the conductivity between the two electrically conductive films, across the isolating film, to thereby derive an electrical signal having a defined parameter whose value represents the sharpness of the entire image formed on the isolating film sandwiched between the conductive films.

15. Apparatus as in claim 1 including a photographic camera having an image receiving surface, an objective lens for projecting an image on the image receiving surface, wherein the means for forming said selected image comprises means for forming on the medium an image whose sharpness is functionally relates to that of the image projected by the objective lens on the image receiving surface, thereby deriving a signal which is functionally related to the degree of sharpness of the image projected on said image receiving surface.

16. Apparatus as in claim 15 including means responsive to said signal for changing the focusing of said objective lens in accordance with said signal.

17. Apparatus as in claim 1 including a projector having an image carrier, a projection lens, and a light source for projecting the image from the carrier onto a screen plane, wherein the means for forming said selected image comprises means forming on said medium an image whose sharpness is functionally related to that of the image projected on the screen plane, thereby deriving a signal functionally related to the degree of sharpness of the image projected on the screen plane.

18. Apparatus as in claim 17 including means responsive to said signal for changing the focusing of said projection lens in accordance with said signal.

19. Apparatus as in claim 1 wherein said strain disturbance is a strain wave progagating through the portion of the medium on which the image is formed and having a spatial frequency which repeatedly scans through a defined frequency range.

20. Apparatus as in claim 19 wherein said strain wave comprises two strain waves propagating through the medium along two dimensions of the image formed thereon.

21. Apparatus as in claim 1 wherein said strain disturbance comprises two strain waves propagating through the medium along two dimensions of the image formed thereon.

22. Apparatus as in claim 21 wherein the spatial frequency of each strain wave repeatedly scans through a defined frequency range.

23. Apparatus as in claim 1 including a microscope having means for forming a magnified image of an object, wherein the means for forming said selected image comprises means for forming on the medium an image whose sharpness is functionally related to that of the magnified image, thereby deriving a signal which is functionally related to the degree of sharpness of the magnified image.

24. Apparatus as in claim 1 including an optical system providing an image modulated thereby, wherein the means for forming said selected image comprises means for forming on the medium an image whose sharpness is functionally related to that of the modulated image, thereby deriving a signal which is functionally related to the degree of sharpness of the modulated image.

25. Apparatus as in claim 1 including a range finder comprising a focussing lens system and a focussing ring with distance marking, wherein the means for forming said selected image comprises means for forming on the medium an image whose sharpness is functionally related to that of the image formed by said focussing lens system and to the position of the focussing ring, thereby deriving a signal which has an optimum value for a focussing ring setting corresponding to a distance marking for the distance between a selected scene and the lens system.

26. Apparatus as in claim 1 including an optical system having a first element and a second element, means for modulating an image with the combination of the two elements, means for changing the position of the two elements with respect to each other, wherein the means for forming said selected image comprises means for forming on the medium an image whose sharpness is functionally related to that of the modulated image, thereby deriving a signal functionally related to the degree of sharpness of the modulated image.

27. A method for detecting the sharpness of an image comprising:
provding a medium having a measurable property which varies as a function of the intensity pattern of an image formed thereon and as a function of strain disturbances in the medium;
forming a selected image on the medium;
causing a selected strain disturbance in the medium which propagates along the image formed thereon; and
measuring said property while the selected image is formed on the medium and while the selected strain disturbance is present therein to derive thereby a signal which is a Fourier transform representation of an aspect of the entire image and which represents the sharpness of the entire selected image formed on the medium and is substantially independent of the average intensity of the image formed on the medium and utilizing said signal for control purposes.

28. A method as in claim 27 wherein the selected strain disturbance is periodic in time and space.

29. A method as in claim 28 wherein said selected strain disturbance is a strain wave propagating through the portion of the medium on which the selected image is formed.

30. A method as in claim 29 wherein said strain wave is a surface wave propagating through the medium.

31. A method as in claim 27 wherein the property of the medium varies as a function of the variations in the intensity pattern of the image along a single selected dimension of the selected image.

32. A method as in claim 27 wherein the property of the medium varies as a function of the intensity pattern along at least two dimensions of the selected image.

33. A method as in claim 27 wherein the strain disturbance is a strain wave propagating through the medium, the signal derived is an electrical signal whose magnitude substantially corresponds to a Fourier transform representation of the intensity pattern along at least one dimension of the selected image for the spatial frequency of the strain wave.

34. A method as in claim 27 wherein the selected image is functionally related to at least a portion of a desired photograghic image formed by an objective lens and including the step of changing the focusing of said objective lens in accordance with the magnitude of the measured signal.

35. A method as in claim 27 wherein the selected image formed on said medium is functionally related to a photographic image projected by a projector lens on a screen plane, and including the step of focusing said projector lens in accordance with the magnitude of the derived signal.

36. A method for detecting the sharpness of an image comprising:
obtaining selected high frequency components of the spatial Fourier transform of an image by modulating an electrical property of a body by the interaction of the image and strain waves in the body which have frequency characteristics corresponding to said components;
measuring the intensity of said high frequency components;
providing a signal which is indicative of the magnitude of said measured intensity and of the sharpness of the image; and
utilizing said signal for sharpness controlling purposes.

37. Apparatus for detecting the sharpness of an image comprising:
means for obtaining the spatial Fourier transform of an image including a body and means for modulating an electrical property of the body by causing the interaction therein of the image and strain waves having frequency characteristics corresponding to selected high spatial frequency components of said transform;
means for detecting the intensity of said selected high frequency components of the spatial Fourier transform of the image;
means for providing a signal indicative of said intensity and of the image sharpness; and
means for utilizing said signal for sharpness controlling purposes.

38. A system comprising:
a lens assembly for forming an image of a scene onto an image receiving surface and means for changing the focusing of said lens assembly to hereby change the sharpness of the image formed on said image receiving surface;
a medium and means for forming on said medium an image whose sharpness is functionally related to that of the image formed on said surface;
means for propagating a selected strain disturbance in the medium along the image formed thereon; and
means for measuring a selected property of the medium while said image is formed thereon and said disturbance is present therein and for deriving thereby a signal whose steady state represents the sharpness of the image formed on the medium.

39. A system as in claim 29 wherein said strain disturbance includes at least one strain wave whose spatial wavelength is substantially shorter than the size of the image formed on the medium and the signal comprises an indication of the term of the Fourier series representation of the image formed on the medium which corresponds to said wavelength.

40. A system as in claim 29 including means responsive to said signal for changing the focusing of said lens in accordance with the signal.

41. A method comprising the steps of:
forming the image of a scene onto a medium;
propagating a selected strain disturbance in the medium along the image formed thereon;
measuring a selected property of the medium while said image is formed thereon and said strain disturbance is present therein and deriving thereby a signal whose steady state level represents the sharpness of the image formed on the medium; and
utilizing the signal indicating the sharpness of the image for control purposes.

42. A method as in claim 38 wherein the strain disturbance includes at least one spatial wavelength which is substantially shorter than the size of the image and the signal corresponds to the term of the Fourier series representation of the image formed on the medium which corresponds to said wavelength.

43. Apparatus for detecting the sharpness of an image represented by a beam at a selected plane transverse to the beam comprising:
a first device and a second device;
means for forming a first pattern on the first device and a second pattern on the second device, the sharpness of the first pattern coresponding to the image sharpness at a first plane on one side of said selected plane along the beam axis and the sharpness of the second pattern coresponding to the image sharpness at a second plane on the other side of said selected plane along the beam axis;
means for causing in said first and second devices interactions of said first and second pattern respectively and selected strain disturbances and for deriving therefrom respective first and second signals determined by selected high spatial frequency Fourier transform components of the first and second patterns respectively; and
means for combining said first and second signals to find a detection signal representing the degree of sharpenss of the image at said selected plane.

44. Apparatus as in claim 43 wherein said combining means includes means for deriving a direction signal representing the direction along the beam axis from the selected plane toward the plane of best sharpness.

45. Apparatus as in claim 44 wherein each of said devices comprises a medium having an electrical property varying with strain disturbances in the medium and with the intensity distribution of light on the medium, and the deriving means for each device include means for measuing said property of the medium while said strain disturbances are present and while the pattern is formed on the medium to thereby derive said signal representing the sharpness of the pattern.

46. Apparatus as in claim 43 including means for supporting the first and second devices at respective first and second positions which are spaced from each other along the beam axis and flank the selected plane.

47. Apparatus as in claim 43 including means for supporting said first and second devices at a common position with respect to the selected plane.

48. Apparatus as in claim 47 including optical means interposed between the beam and at least one of the devices to form on the two devices patterns correponding to two different image planes spaced from each other along the beam axis.

49. Apparatus as in claim 43 wherein the combining means comprises means for comparing said and first and second signals and for providing a detection signal corresponding to the degree of imbalance between the first and second signals.

50. Apparatus as in claim 43 wherein each of said devices comprises a medium capable of propagating strain disturbances at spatial frequencies extending through a defined range and having an electrical property varying said spatial freqencies and with the intensity distribution of a pattern formed on the medium, and the means for causing said interaction and deriving said signals comprise, for each device, means for causing strain disturbances in the medium at a subset of spatial frequencies which is small as compared with said range, and means for measuring said electrical property on the medium while a pattern is formed on the medium and while said subset of strain disturbances is present to derive said signal representing transform components of the pattern.

51. Apparatus as in claim 50 including an optical system for viewing a scene and forming said image beam by modulating the scene in accordance with characteristics of the optical system, whereby the detection signal represents the degree of sharpness of the modulated image at a selected plane with respect to the optical system and therefore represents characteristics of the optical system.

52. Apparatus for detecting the quality of an image represented by a beam at a selected plane transverse to the beam comprising:
a first device and second device;
means for forming a first pattern on the first device and a second pattern on the second device, the quality of the first pattern corresponding to the image quality at a first plane on one side of the selected plane along the beam axis and the quality of the second pattern corresponding to the image quality at a second plane on the other side of said selected plane along the beam axis;
means for causing in said first and second device respective interactions between the first and second pattern and selected strain waves and for deriving therefrom respective first and second signals corresponding to selected high spatial frequency Fourier transform components of the first and second patterns respectively; and
means for combining the first and second signals to find a detection signal representing the quality of the image at the selected plane.

53. Apparatus as in claim 52 wherein said detection signal represents the degree of sharpness of the image at the selected plane and the direction along the beam axis from the selected plane towards the plane of best sharpness of the image.

54. Apparatus as in claim 52 wherein each device is capable of providing a range of Fourier transform components of the respective pattern and wherein the deriving means derives components corresponding to a subset of high spatial frequencies which is small as compared with said range.

55. A method of detecting the sharpness of an image represented by a beam at a selected plane transverse to the beam comprising the steps of:
providing a first device and a second device;
forming a first pattern on the first device and a second pattern on the second device, the sharpness of the first pattern corresponding to the image sharpness at a first plane on one side of said selected plane along the beam axis and the sharpness of the second pattern corresponding to the image sharpness at a second plane on the other side of said selected plane along the beam axis;
causing in each device an interaction of the respective pattern and selected strain waves in the device;
deriving from said first and second devices respective first and second signals determined by the respective interactions and corresponding to selected high spatial frequency Fourier transform components of the first and second patterns respectively; and
combining said first and second signals to find a detection signal representing the degree of sharpness of the image at said selected plane.

56. A method as in claim 55 wherein said combining step includes deriving a direction signal representing the direction along the beam axis from the selected plane toward the plane of best sharpness.

57. A method as in claim 55 wherein each device is capable of providing transform components of the respective pattern corresponding to a range of spatial frequencies and wherein the deriving step comprises deriving components corresponding to a subset of said spatial frequencies which is small as compared to said range.

58. A method of detecting the quality of an image formed by an optical system comprising the steps of:
providing a device and forming on the device a pattern whose quality is functionally related to the image quality at said selected plane;
causing in the device an interaction of the pattern and selected strain waves of arbitrarily selected frequency characteristics;
deriving from said device signals determined by said interaction and corresponding to selected high spatial frequency Fourier transform components of the pattern by the interaction of an image of the pattern and strain waves propagating in a medium of selected acousto-electrical properties; and
combining said signals to find a detection signal representing the quality of the image at said selected plane.

59. A method as in claim 58 including the step of modifying the optical system in accordance with the detection signal to thereby modify the image provided by the system.

60. A method as in claim 58 wherein the causing step comprises causing strain waves within a frequency range which is small as compared to the range of frequencies of the strain waves that the device is capable of propagating.

* * * * *